(12) United States Patent
Bellotto et al.

(10) Patent No.: US 6,330,142 B1
(45) Date of Patent: Dec. 11, 2001

(54) TRIP DEVICE WITH A PLURALITY OF MEANS FOR SETTING THE PROTECTION PARAMETERS

(75) Inventors: Henry Bellotto, Saint Martin d'Heres; Eric Suptitz, Montaud; Luc Weynachter, Grenoble, all of (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/407,058

(22) Filed: Sep. 28, 1999

(30) Foreign Application Priority Data

Oct. 28, 1998 (FR) .................................................. 98 13712

(51) Int. Cl.$^7$ ....................................................... H02H 3/00
(52) U.S. Cl. .................................................................. 361/93.3
(58) Field of Search ................................... 361/93.1, 93.2, 361/93.3, 93.4, 93.5, 93.6, 42, 47, 48, 78, 79

(56) References Cited

U.S. PATENT DOCUMENTS 4,945,443 * 7/1990 DeBiasi et al. ..................... 361/93.1
5,311,392   5/1994 Kinney et al. ......................... 361/93

FOREIGN PATENT DOCUMENTS 0 693 812 A1   1/1996 (EP) .................. H02H/3/00
0 716 491 A1   6/1996 (EP) .................. H02H/3/00

* cited by examiner

*Primary Examiner*—Ronald W. Leja
(74) *Attorney, Agent, or Firm*—Parkhurst & Wendel, L.L.P.

(57) ABSTRACT

Selector switches placed on the front panel of the trip device enable first protection parameters to be set. The trip device comprises communication means enabling second protection parameters to be set by remote setting. The trip device compares each first parameter with the corresponding second parameter and determines third protection parameters representative of the lower of the first and second parameters. The third protection parameters are taken into account by the trip device for protection against overloads and short-circuits and are displayed on the front panel of the trip device when setting of the parameters takes place or on request.

10 Claims, 6 Drawing Sheets

TRIP DEVICE WITH A PLURALITY OF MEANS FOR SETTING THE PROTECTION PARAMETERS

BACKGROUND OF THE INVENTION

The invention relates to a trip device comprising setting selector switches designed to define first protection parameters representative of an overload or a short-circuit and accessible to a user, display means, a processing unit connected to current sensors and to the setting selector switches, the processing unit comprising:

first digital processing means connected to the current sensors and to the setting selector switches in order to perform basic protection functions, second digital processing means connected to the first processing means and to communication means enabling second protection parameters to be set by remote setting.

Known trip devices conventionally comprise potentiometers and/or selector switches on the front panel enabling the protection parameter settings to be adjusted. Others comprise a keypad combined with a display enabling the protection parameter settings to be adjusted and read. The latter trip devices also sometimes comprise means for remote setting of the parameters.

Figure 1:
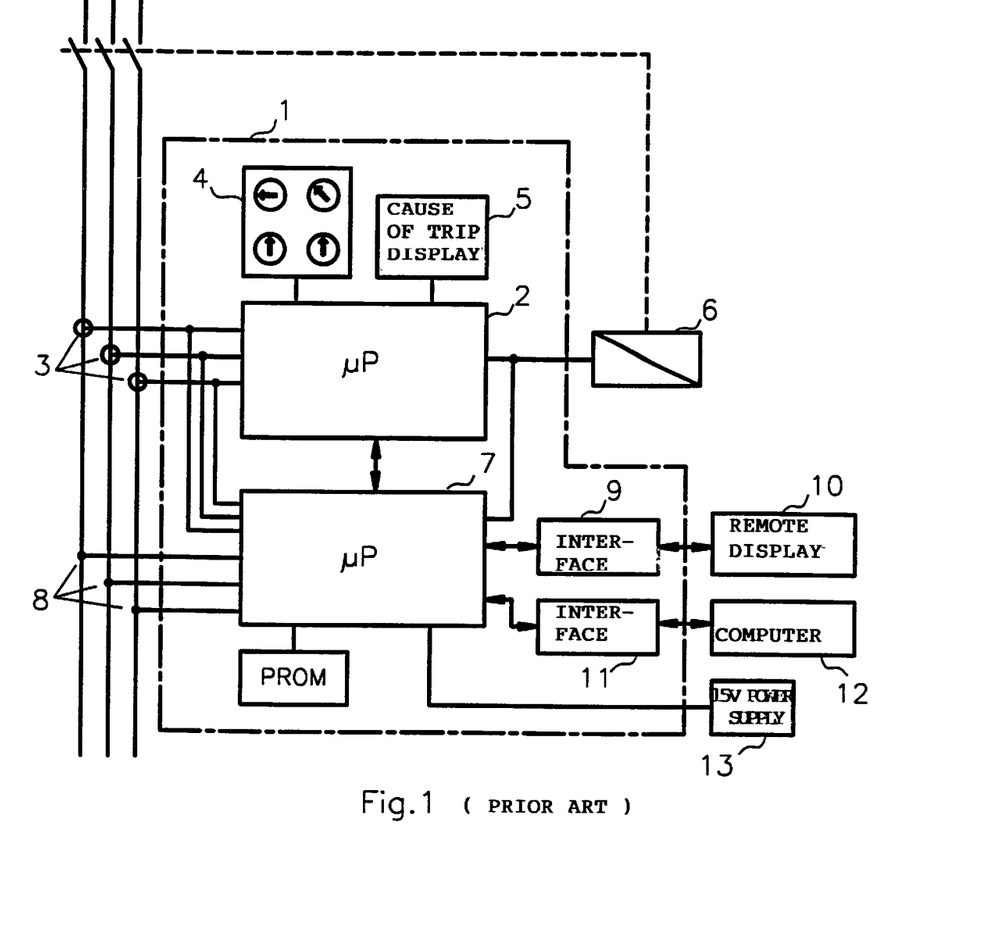
FIG. 1 illustrates a trip device with two microprocessors according to the prior art, as described above.

U.S. Pat. No. 5,311,392 describes a trip device comprising two microprocessor-based processing circuits. Such a trip device 1 is illustrated in FIG. 1. It comprises a first microprocessor-based processing circuit 2 designed to perform protection against overloads and short-circuits, i.e. the long delay, short delay, instantaneous and, if applicable, earth protection functions. This first processing circuit is conventionally connected to current sensors 3, to selector switches 4 located on a front panel of the trip device, to a cause of trip display device 5 and to a trip coil 6. It comprises a second microprocessor-based processing circuit 7 designed to perform communication functions and additional monitoring and protection functions (as regards voltage, phase displacement, power, frequency, etc). The second processing circuit 7 is connected to the first processing circuit by a two-way link. It is also connected to the current sensors 3 and to voltage sensors 8. It is also connected to a first interface 9 designed to be connected to a remote display device 10, and to a second interface 11 designed to be connected to a computer 12. The second processing circuit 7 also performs a backup protection function in case of malfunctioning of the first processing circuit. The unbroken line in FIG. 2 represents a time/current tripping curve used by the first processing circuit 2, taking into account the protection parameters defined by the selector switches 4.

Figure 2:
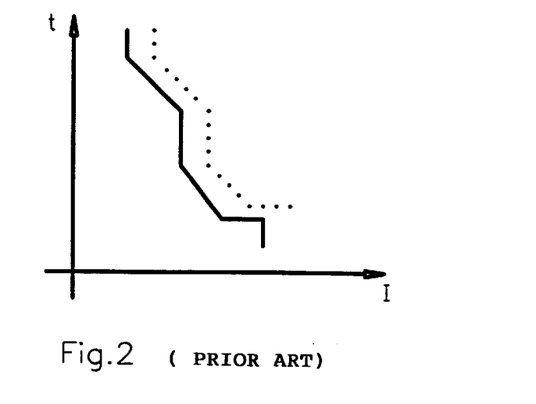
FIG. 2 represents the tripping curves of the trip device according to FIG. 1.

The second processing circuit performs the backup function taking into account a second tripping curve represented in a broken line in FIG. 2. The protection parameters corresponding to the second tripping curve are systematically higher than the values set by the selector switches. They can be preset, unable to be modified by the user, or adjustable by means of the interfaces 9 and 11, or be set by a shift of the first curve. The second processing circuit is continuously supplied by an auxiliary power supply 13 and comprises a trip output connected to the trip coil 6. In normal operation, the first processing circuit 2 performs the current protection functions according to the current measured by the current sensors 3 and the parameters defined by the selector switches, the second processing circuit performing additional measuring and protection functions. In the event of a failure of the first processing circuit, the second processing circuit performs the current protection functions using the same current values measured by the current sensors 3 and the backup parameters corresponding to the second curve of FIG. 2.

SUMMARY OF THE INVENTION

The object of the invention is to achieve a trip device having means for adjusting the protection parameters suitable for both a bottom-of-the-range trip device and a top-of-the-range trip device.

According to the invention, this object is achieved by the fact that the display means are connected to the second processing means, the processing unit comprising means for comparing the first and second parameters, means for determining third protection parameters representative of the lower of the first and second parameters, the display means displaying the third protection parameters and the processing unit producing a trip signal according to the current measured by the current sensors and to the third protection parameters.

According to a first alternative embodiment, the first processing means produce a first trip signal according to the current measured by the current sensors and to the first protection parameters, the second processing means producing a second trip signal according to the current measured by the current sensors and to the third protection parameters, a logic OR circuit supplying a trip signal when it receives a first or a second trip signal.

According to a second alternative embodiment, the first processing means preferably produce a trip signal according to the current measured by the current sensors and to the third protection parameters.

According to a development of the invention, the trip device comprises a keypad connected to the processing unit, designed to define fourth protection parameters and accessible to a user, the processing unit determining the third protection parameters from the lowest of the first, second and fourth parameters.

According to another development of the invention, the trip device comprises a cover covering the setting selector switches, the trip device comprising means for disabling the setting adjustment function of the keypad in a closed position of the cover.

The cover is preferably constituted by a door located on a front panel of the trip device and covering the setting selector switches in the closed position of the cover, the door comprising a spigot actuating a complementary element of the processing unit in the closed position of the cover so as to cause the setting adjustment function of the keypad to be disabled. The spigot is preferably breakable so that disabling of the setting adjustment function of the keypad in the closed position of the cover can be over-ridden.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF THE PREFERRED EMBODIMENT

Figure 3:
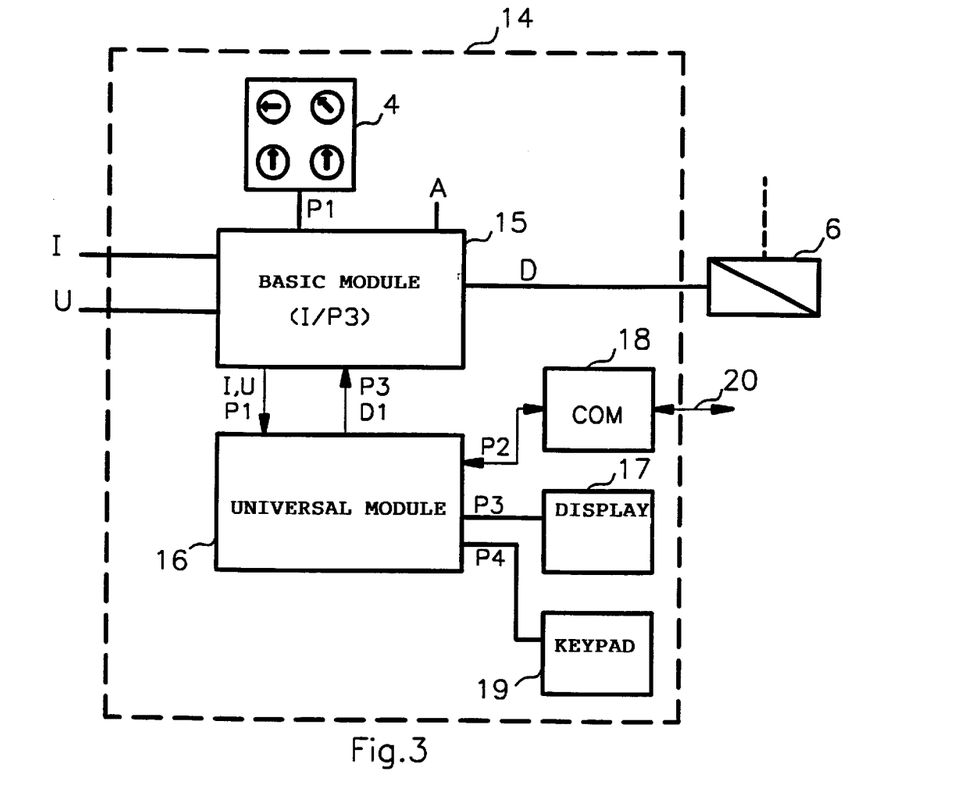
FIG. 3 represents a particular embodiment of a trip device according to the invention.

The trip device 14 according to FIG. 3 comprises a basic module 15 constituting a first digital processing unit designed to perform the overload and short-circuit protection functions (long delay, short delay, instantaneous and if applicable earth protection) of the trip device. This module is preferably formed by an ASIC type integrated circuit and may comprise a microprocessor. It is connected, as in the prior art, to current sensors which supply it with the values I of the current in the conductors of a power system to be protected and to the trip coil 6 to which it supplies a trip signal D in the event of an overload or short-circuit. It is connected in conventional manner to selector switches 4 which supply it with first protection parameters P1.

Such a basic module is used for a whole range of trip devices. The most simple only comprise the elements described above. A top-of-the-range trip device according to the invention comprises the same elements, completed as represented in FIG. 3. It comprises a universal module constituting a second digital processing unit, preferably microprocessor-based. The universal module 16 is connected to a display device 17 located on the front panel of the trip device, to a communication module 18 and, possibly, to a keypad 19 and to the basic module 15.

The communication module 18 is connected to an external bus 20 enabling, among other things, second protection parameters P2 to be supplied to the trip device by remote setting. In a preferred embodiment, the universal module 16 receives from the basic module 15 the values I and U of the measured currents and voltages and the values of the first protection parameters P1 set by the selector switches. It determines the protection parameters P3 which have to be taken into account by the trip device 14, these parameters being displayed on the display device 17, when they are set or on request, and being transmitted to the basic module 15.

The universal module 16 preferably also performs additional protection functions, for example voltage, power, and frequency protection functions, from the current and voltage values which are supplied to it by the basic module. Calculation of the power can be performed by the basic module and then transmitted to the universal module, or directly by the universal module. The latter may be connected to more precise additional current sensors (not represented) enabling a more precise analysis to be made of the current flowing in the conductors to be protected, for example a harmonics analysis. The universal module receives, via the communication module 18 or the keypad 19, the values of the parameters to be taken into account by the additional protection functions. In the event of a fault, it produces an alarm signal and/or trip signal D1, which is transmitted to the basic module 15 which causes excitation of the trip coil 6.

Figure 4:
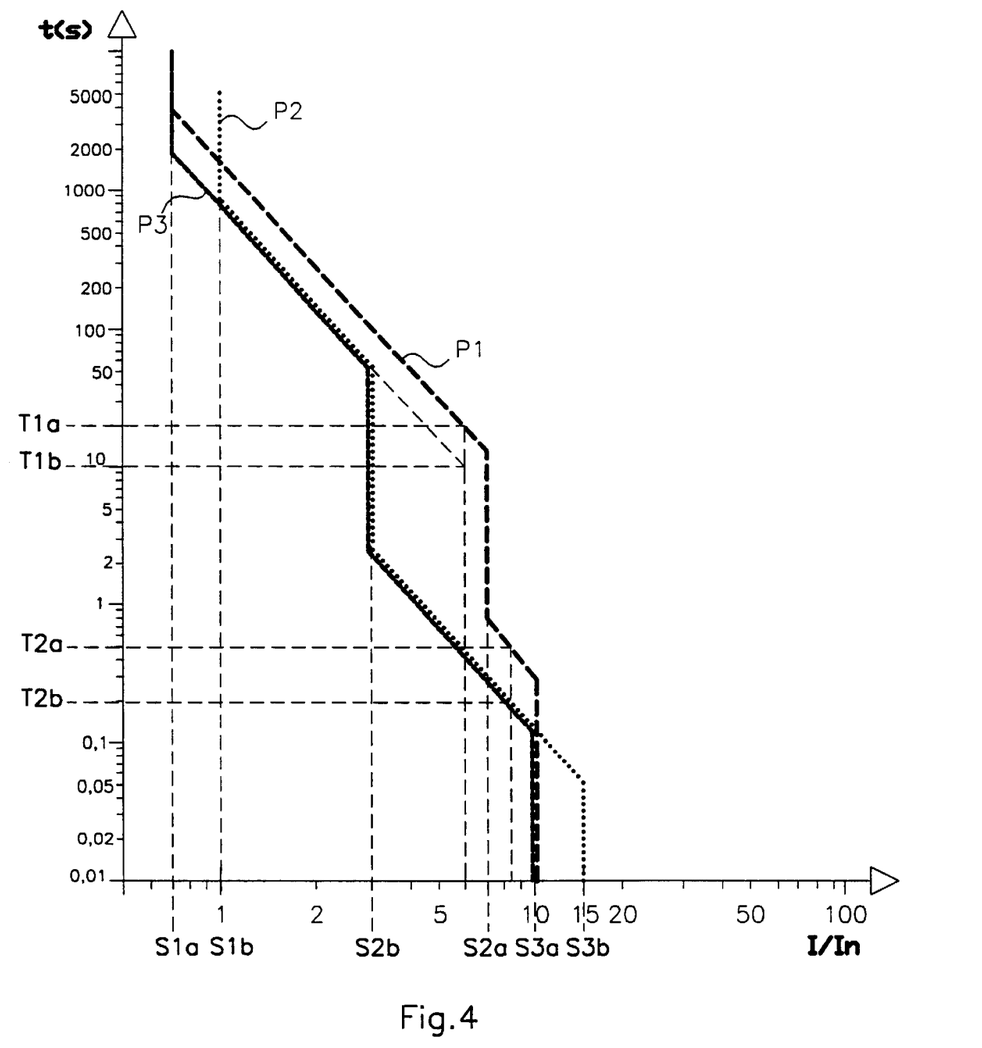
FIG. 4 represents the tripping curves of a trip device according to FIG. 3.

The trip device 14 always takes into account the parameter P3 representative of the lower of the first and second parameters P1 and P2, as represented in FIG. 4.

Three time/current tripping curves, corresponding respectively to the parameters P1, P2 and P3, are represented in FIG. 4. Each curve represents, in logarithmic coordinates, the tripping time t as a function of the ratio I/In, In being the rated current of the trip device which can be determined in known manner by a calibration module.

In FIG. 4, the parameters P1 have the following values:

Long delay threshold S1a=0.7 In

Long delay time T1a=20s at 6 In

Short delay threshold S2a=7 In

Short delay time T2a=0.5s at 8 In

Instantaneous threshold S3a=10 In

The parameters P2 have the following values:

Long delay threshold S1b=In

Long delay time T1b=10s at 6 In

Short delay threshold S2b=3 In

Short delay time T2b=0.2s at 8 In

Instantaneous threshold S3b=15 In

The long delay and short delay tripping curves are, in the embodiment represented, $I^2t$ curves.

Figure 5:
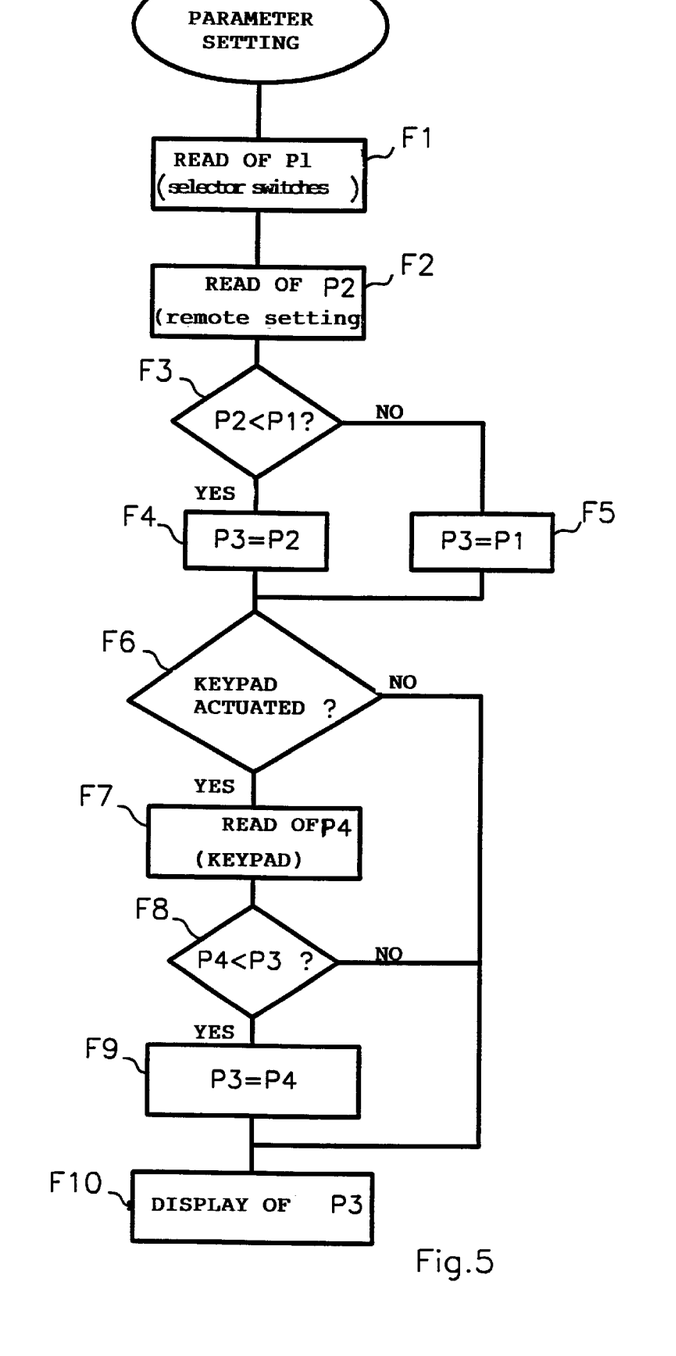
FIG. 5 illustrates a particular embodiment of a flow chart for determining the protection parameters of a trip device according to the invention.

A sub-routine for determining the third protection parameters used by the trip device is illustrated in FIG. 5. In the particular embodiment represented in a step F1, the microprocessor of the universal module 16 reads the parameters P1 defined by the selector switches 4, which are transmitted to said microprocessor by the basic module 15. Then, in a step F2, it reads the parameters P2 corresponding to the remote settings which have been transmitted to said microprocessor by the bus 20 and the communication module 18.

In a step F3, it compares each parameter P2 with the associated parameter P1, i.e. it compares S1a to S1b, S2a to S2b, T1a to T1b, T2a to T2b and S3a to S3b. If the parameter P2 is lower than the associated parameter P1 (YES output of F3), it gives the associated parameter P3 the P2 value (step F4). In the opposite case (NO output of F3), the parameter P3 takes the corresponding P1 value (step F5).

In the embodiment of FIG. 4, P3 consequently takes the following values:

Long delay threshold: S1=S1a=0.7 In

Long delay time: T1=T1b=10s at 6 In

Short delay threshold: S2=S2b=3 In

Short delay time: T2=T2a=0.2s at 8 In

Instantaneous threshold: S3=S3a=10 In

When the keypad 19 is activated, fourth parameters P4 are transmitted to the universal module 16. The microprocessor of the universal module checks in a step F6 (FIG. 5) if the keypad is actuated. If this is the case (YES output of F6), it reads the values of the parameters P4 in a step F7, then, in a step F8, it compares the parameters P4 to the associated parameters P3. If a parameter P4 is lower than the associated parameter P3 (YES output of F8), the parameter P3 takes the corresponding P4 value. After the step F9, or if there is no actuation of the keypad (NO output of F6), or if P4 is not lower than P3 (NO output of F8), the universal module microprocessor proceeds with display of the parameters P3 (step F10) on the display device 17 located on the front panel of the trip device.

In the embodiment of FIG. 3, the parameters P3 are transmitted to the basic module 15 which performs the basic current protection functions according to the current I measured by the current sensors and to the third protection parameters P3. The universal module can also perform these functions, in redundant manner, or only perform additional protection functions and measuring functions.

The trip device 14 described above thus has three means for adjusting the current protection parameters: the selector switches 4 located on the front panel, remote setting by means of the bus 20 and communication module 18 and the keypad 19 located on the front panel of the trip device. Bottom-of-the-range trip devices only comprise the selector switches. These selector switches are kept on the top-of-the-range trip device comprising a keypad and display and which are able to be adjusted by remote setting. Keeping the selector switches on top-of-the-range trip devices enables the user to continue using the type of setting adjustment by means of selector switches which he is used to and to proceed in the same way on all the trip devices of the range. However, with a top-of-the-range trip device, he can, if he so desires, use the keypad instead of the selector switches or use the remote programming.

As the trip device always chooses the lowest parameter, the selector switches can be considered as defining the ultimate protection of the installation, i.e. a tripping curve which cannot be exceeded either by a local adjustment via the keypad or by a remote adjustment by means of the communication module. The reliability of the system remains that of the basic module for all the trip devices of the range. Should the universal module 16 be out of operation, the basic module 15 still continues to function.

Moreover, actuation of a selector switch results in display on the front panel of the parameter taken into account by the trip device, as does remote setting or setting via the keypad.

The basic module 15 can comprise an input receiving a signal A (FIG. 3) enabling the parameters supplied by remote setting to be taken into account or not. For example, if the signal A is at a logic level 1 (5V for example), the basic module takes account of the P3 parameters. If on the other hand the signal A is at a logic level 0 (0V for example), then it does not take account of the P3 parameters and automatically performs protection according to the P1 parameters supplied by the selector switches. In this case, this information is preferably transmitted to the universal module which takes as P3 values the values of the P1 parameters so as to display the latter, the display thus corresponding to the value actually taken into account by the protection.

Figure 6:
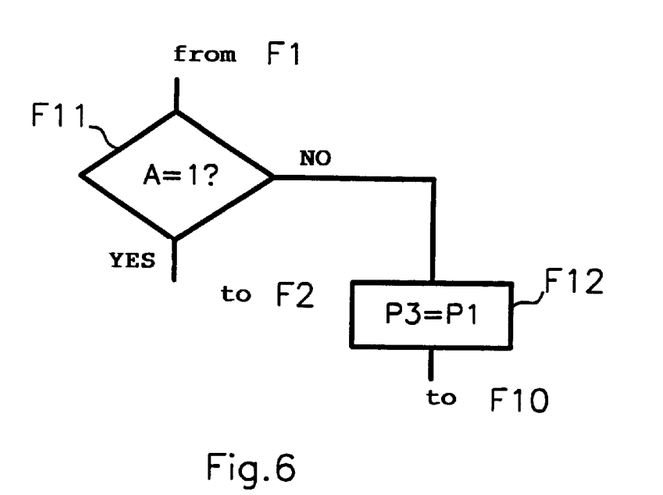
FIG. 6 illustrates an alternative version of the flow chart according to FIG. 5.

A sub-routine illustrating this alternative embodiment is represented in FIG. 6. It comprises a step F11, performed after the step F1, for checking the value of A. If A=1 (YES output of F11), the basic module is authorized to take into account the remote setting and the microprocessor of the universal module 16 goes to the step F2. If on the other hand A is not equal to 1 (NO output of F11), then in a step F12 the P3 parameters take the values of the corresponding P1 parameters, and the microprocessor then goes directly to the step F10, or possibly to the step F6 if it is required that the basic module be able to take account of a setting via the keypad.

Figure 7:
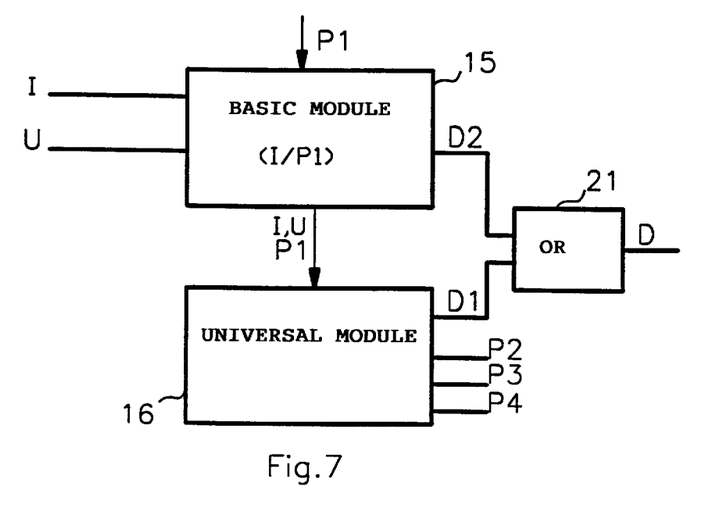
FIG. 7 represents an alternative embodiment of the trip device according to FIG. 3.

In the alternative embodiment of FIG. 7, the universal module 16 and basic module 15 are both connected to a logic circuit 21 performing an OR function and connected to the trip coil 6. The basic module 15 only takes account of the P1 parameters, whereas the universal module 16 determines, as before, the lowest values P3 from the P1, P2 parameters and P4 and displays the P3 parameters. It performs a basic protection according to the P3 parameters and the values of the current I which are transmitted to it by the basic module. In the event of a fault, the universal module 16 supplies to the circuit 21 a trip signal D1 according to the P3 parameters and the basic module 15 supplies to the circuit 21 a trip signal D2 according to the P1 parameters. The trip signal D supplied on output of the circuit 21 thus also corresponds to a tripping curve taking into account the lower parameter.

Figure 8:
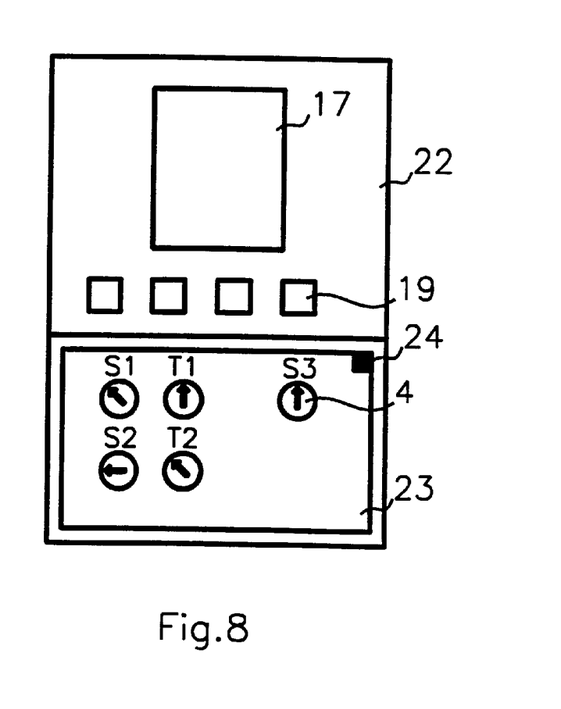
FIG. 8 represents a particular embodiment of the front panel of a trip device according to the invention, comprising a cover in the closed position.

In bottom-of-the-range trip devices, it is known to cover the setting selector switches with a cover, preferably transparent which may be sealed, so as to prevent any subsequent modification of the position of the selector switches or to reserve the possibility of modifying the parameters for authorized persons. The front panel 22 of the trip device represented in FIG. 8 comprises such a cover 23 formed by a transparent door which can be opened to access the setting selector switches 4. The door is represented in the open position in FIG. 9. In a preferred embodiment, when the cover 23 is closed, the keypad 19 remains accessible but its setting adjustment function is disabled. Display for example of the protection parameters P3, of the measured current or voltage values, of the calculated power values etc. can thus be requested via the keypad. It can however no longer supply new protection parameters P4 in the closed position of the cover 23.

Figure 9:
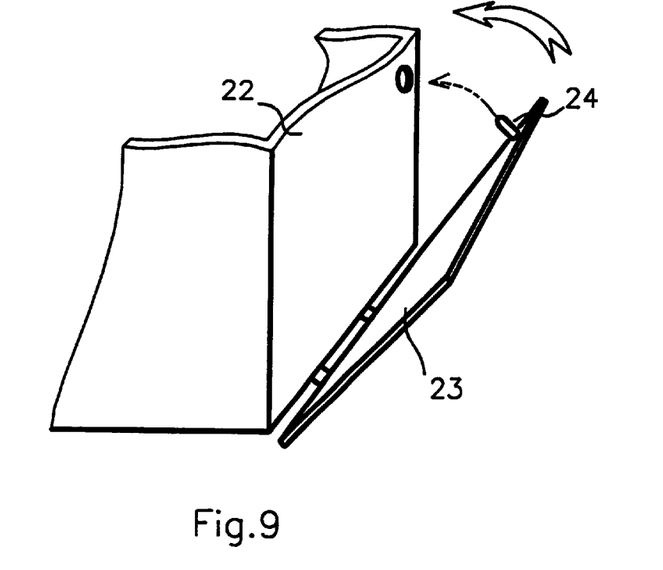
FIG. 9 illustrates, in the open position, a particular embodiment of the cover according to FIG. 8.

The door comprises, for example, a spigot 24 which actuates a complementary element preferably constituted by an electronic contact situated on a printed circuit board of the processing unit, preferably of the universal module 16.

When the door is closed, the contact 25 is actuated and the universal module software prevents protection parameters P4 from being entered via the keypad 19.

Figure 10:
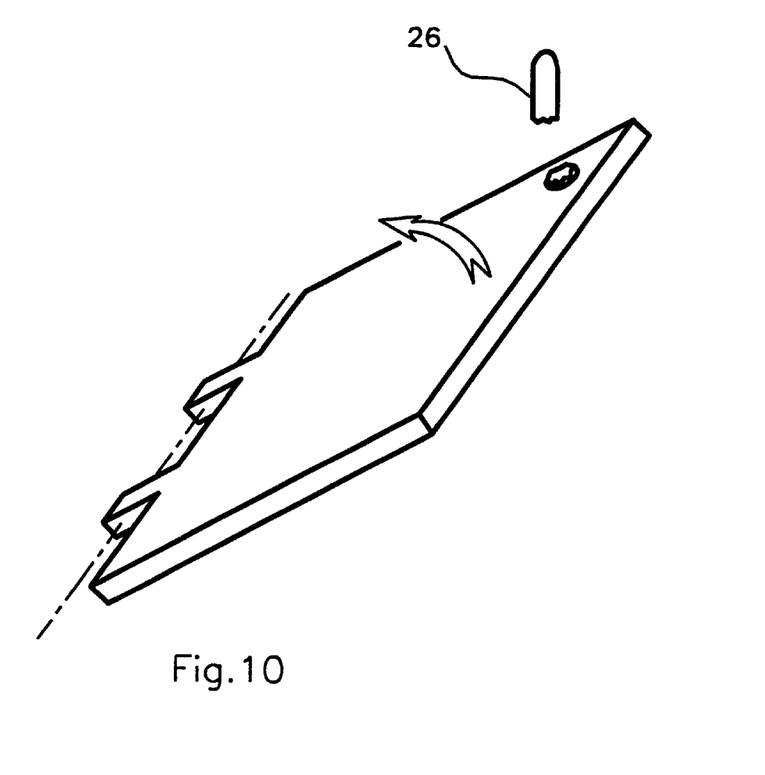
FIG. 10 represents, in an enlarged view, a breakable spigot of the cover according to FIG. 9.

The spigot 24 is preferably breakable. Removing the breakable part 26 of the spigot (FIG. 10) overrides disabling of the keypad setting function. The cover being sealed then prevents any modification of the ultimate protection of the installation, as set by the selector switches 4, while enabling modification of the protection by means of the keypad 19.

The invention applies not only to long delay and short delay $I^2t$ tripping curves as in FIG. 4, but to any type of tripping curve (constant time, extremely inverse, etc.).

The invention therefore enables a real consistency to be obtained between three setting levels (selector switches, remote setting and keypad). The use of a basic module, preferably in ASIC form, whatever the type of trip device increases the reliability of the trip device. The complexity of the communication functions, display functions etc performed by the universal module does not in fact downgrade the reliability of the basic protection performed by the ASIC.

What is claimed is:

1. A trip device comprising setting selector switches designed to define first protection parameters representative of an overload or a short-circuit and accessible to a user, display means, a processing unit connected to current sensors and to the setting selector switches, the processing unit comprising:

first digital processing means connected to the current sensors and to the setting selector switches in order to perform basic protection functions, second digital processing means connected to the first processing means and to communication means enabling second protection parameters to be set by remote setting, the trip device wherein the display means are connected to the second processing means, the processing unit comprising means for comparing the first and second parameters, means for automatically determining actual third protection parameters representative of the lower of the first and second parameters, the display means displaying the third protection parameters as points on a tripping curve and the processing unit producing a trip signal according to the current measured by the current sensors and to the third protection parameters.

2. The trip device according to claim 1, wherein the first processing means produce a first trip signal according to the current measured by the current sensors and to the first protection parameters, the second processing means producing a second trip signal according to the current measured by the current sensors and to the third protection parameters, a logic OR circuit supplying a trip signal when it receives a first or a second trip signal.

3. The trip device according to claim 1, wherein the first processing means produce a trip signal according to the current measured by the current sensors and to the third protection parameters.

4. The trip device according to claim 1, comprising a keypad connected to the processing unit, designed to define fourth protection parameters and accessible to a user, the processing unit determining the third protection parameters from the lowest of the first, second and fourth parameters.

5. The trip device according to claim 4, wherein the keypad is connected to the second processing means.

6. The trip device according to claim 4, comprising a cover covering the setting selector switches, the trip device comprising means for disabling the setting adjustment function of the keypad in a closed position of the cover.

7. The trip device according to claim 6, comprising means for sealing the cover in the closed position, so as to prevent any subsequent modification of the position of the selector switches.

8. The trip device according to claim 6, wherein the cover is constituted by a door located on a front panel of the trip device and covering the setting selector switches in the closed position of the cover, the door comprising a spigot actuating a complementary element of the processing unit in the closed position of the cover so as to cause disabling of the setting adjustment function of the keypad.

9. The trip device according to claim 8, wherein the spigot is breakable so that disabling of the setting adjustment function of the keypad in the closed position of the cover can be overridden.

10. The trip device according to claim 1, wherein the first processing means comprise an input enabling the parameters supplied by remote setting to be taken into account or not.

* * * * *